US008271516B2

(12) United States Patent
Gounares et al.

(10) Patent No.: US 8,271,516 B2
(45) Date of Patent: Sep. 18, 2012

(54) SOCIAL NETWORKS SERVICE (75) Inventors: Alexander G. Gounares, Kirkland, WA (US); Eric J. Horvitz, Kirkland, WA (US); Kenneth D. Ray, Seattle, WA (US); Oren Rosenbloom, Redmond, WA (US); Hubert Van Hoof, Seattle, WA (US); Chris Demetrios Karkanias, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 699 days.

(21) Appl. No.: 12/137,665

(22) Filed: Jun. 12, 2008

(65) Prior Publication Data

US 2009/0313235 A1   Dec. 17, 2009

(51) Int. Cl.
*G06F 7/00* (2006.01)
*G06F 17/30* (2006.01)
*G06F 15/18* (2006.01)
*G06F 17/00* (2006.01)
*G06Q 10/00* (2012.01)
*G09B 3/00* (2006.01)
*G09B 7/00* (2006.01)
*G06N 5/00* (2006.01)
*G06N 5/02* (2006.01)
*G06N 3/00* (2006.01)
*G06N 3/12* (2006.01)

(52) U.S. Cl. ........ 707/768; 707/723; 707/732; 707/753; 707/767; 705/7.14; 434/322; 434/350; 706/12; 706/13; 706/14; 706/45; 706/46

(58) Field of Classification Search .................. 707/732; 705/7.14; 434/322, 350; 706/12–14, 45, 706/46
See application file for complete search history.

(56) References Cited

U.S. PATENT DOCUMENTS

| | | | |
|---|---|---|---|
| 6,064,978 A | 5/2000 | Gardner et al. | |
| 6,175,831 B1 | 1/2001 | Weinreich et al. | |
| 6,453,038 B1 * | 9/2002 | McFarlane et al. | 379/265.05 |
| 7,069,308 B2 | 6/2006 | Abrams | |
| 2003/0158747 A1 * | 8/2003 | Beton et al. | 705/1 |
| 2003/0163356 A1 * | 8/2003 | Marks et al. | 705/7 |
| 2005/0216300 A1 | 9/2005 | Appelman et al. | |
| 2005/0256756 A1 | 11/2005 | Lam et al. | |

(Continued)

OTHER PUBLICATIONS

Kristen Nicole. Zecco Launches Anonymous Social Network for Stock Trades, Oct. 17, 2007, http://mashable.com/2007/10/17/zeccoshare/ Last accessed Oct. 26, 2007, 1 page.

(Continued)

*Primary Examiner* — Vei-Chung Liang
*Assistant Examiner* — Cheryl M Shechtman
(74) *Attorney, Agent, or Firm* — Lee & Hayes, PLLC (57) ABSTRACT

A social network service provides trusted, timely and managed communications between a querying individual and an informed individual by optimizing distribution of queries to reflect a requisite amount of expertise necessary (i.e., interest, background, education, demographic attribute, etc.). Those candidate recipients with a rare level of expertise or specialization can specify a desired level of participation, which is respected. In order not to exhaust their availability, those who are less qualified or part of a larger demographic category appropriate for the query are selected to handle queries of lesser difficulty or less specialization. Anonymity if desired by the recipient party can be supported by increasing the pool of candidate recipients so that the querying party cannot reasonably ascertain who is responding. Timeliness of response, as well as satisfaction in the response, is tracked in order to affect redirection of a query.

20 Claims, 8 Drawing Sheets

U.S. PATENT DOCUMENTS

| | | | |
|---|---|---|---|
| 2006/0009994 A1 | 1/2006 | Hogg et al. | |
| 2006/0064431 A1* | 3/2006 | Kishore et al. | 707/102 |
| 2006/0122974 A1 | 6/2006 | Perisic | |
| 2006/0143068 A1 | 6/2006 | Calabria | |
| 2006/0161599 A1 | 7/2006 | Rosen | |
| 2006/0200434 A1 | 9/2006 | Flinn et al. | |
| 2006/0212561 A1 | 9/2006 | Feng | |
| 2006/0248573 A1 | 11/2006 | Pannu et al. | |
| 2006/0259957 A1* | 11/2006 | Tam et al. | 726/3 |
| 2007/0005695 A1 | 1/2007 | Chen et al. | |
| 2007/0067293 A1* | 3/2007 | Yu | 707/7 |
| 2007/0150603 A1 | 6/2007 | Crull et al. | |
| 2007/0162458 A1 | 7/2007 | Fasciano | |
| 2007/0259325 A1* | 11/2007 | Clapper | 434/350 |
| 2008/0034061 A1 | 2/2008 | Beares | |
| 2008/0045236 A1 | 2/2008 | Nahon et al. | |
| 2009/0162824 A1* | 6/2009 | Heck | 434/322 |
| 2009/0307177 A1* | 12/2009 | Tirpak et al. | 706/53 |
| 2011/0055207 A1* | 3/2011 | Schorzman et al. | 707/723 |

OTHER PUBLICATIONS

About PatientsLikeMe, "Patients Helping Patients Live Better Every Day" http://www.patientslikeme.com/about. Last accessed Oct. 26, 2007, 1 page.

The MDjunction Story—A Healthcare Community Site, Portals and KM, Nov. 17, 2006. http://billives.typepad.com/portals__and__km/2006/11/the__mdjunction__.html. 15 pages.

Daily Strength. http://dailystrength.org/ Last accessed Oct. 26, 2007, 2 pages.

Michael Kanellos. Under-the-skin ID Chips Move Toward U.S. Hospitals. News.com, published on ZDNet News, Jul. 27, 2004. http://news.zdnet.com/2100-9584__22-5285815.html. 12 pages.

* cited by examiner

SOCIAL NETWORKS SERVICE

BACKGROUND

The present innovation pertains to managing a social network over a distributed network, and more particularly to optimizing distribution of queries to particular recipient members of the social network.

A social network service uses software to build online social networks for communities of people who share interests and activities or who are interested in exploring the interests and activities of others. Most services are primarily web based and provide a collection of various ways for users to interact, such as chat, messaging, email, video, voice chat, file sharing, blogging, discussion groups, and so on. The main types of social networking services are those which contain directories of some categories, means to connect with friends (usually with self-description pages), and recommended systems linked to trust. Popular methods now combine many of these. There have been some attempts to standardize these services to avoid the need to duplicate entries of friends and interests, but this has led to some concerns about privacy.

Social networks connect people at low cost; this can be beneficial for entrepreneurs and small businesses looking to expand their contact base. These networks often act as a customer relationship management tool for companies selling products and services. Companies can also use social networks for advertising in the form of banners and text ads. Since businesses operate globally, social networks can make it easier to keep in touch with contacts around the world.

Social networks are beginning to be adopted by healthcare professionals as a means to manage institutional knowledge, disseminate peer to peer knowledge and to highlight individual physicians and institutions. The advantage of using a dedicated medical social networking site is that all the members are screened against the state licensing board list of practitioners. Several websites are beginning to tap into the power of the social networking model for social good. Such models may be highly successful for connecting otherwise fragmented industries and small organizations without the resources to reach a broader audience with interested and passionate users. Users benefit by interacting with a like-minded community and finding a channel for their energy and giving.

Using social networks to obtain information from individuals having a desired background, expertise and interests is challenging. If someone closely associated with the individual had the needed information, then the social network would not be necessary. However, the farther afield these informed individuals are from the individual with questions, the more difficult it is to encourage such communications. Either party may not trust the other. There may be no incentive for the informed person to participate in the communication. Responses may not be made in a timely fashion. Anonymity may undesirably implemented. Attempts to partially address these needs have been proposed or implemented, such as facilitating anonymous communication, creating a virtual system of favors for those who participate, determining a reputation of a participant, authenticating the identity of a participant, and facilitating communication between parties based upon social distance or defined relationships.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that provide optimization of query assignments and tracking to address problems with increasingly larger social network with more ways of interacting with the system. Optimization is directed to finding a good enough recipient who responds within an appropriate amount of time in order not to inundate the best qualified person for mundane questions, respecting their desired level of participation. Anonymity can be maintained by expanding query constraints so that a reasonably large pool of recipients can be queried.

In accordance with one aspect of the subject innovation, a method is provided for selecting a recipient for a query from a party within a social network. A response constraint is received from a first party of a social network. A query containing a query constraint is received from a second party of the social network. A subset of parties of the social network is selected that satisfy the query constraint. The first party in the subset is excluded based upon the response constraint not being satisfied by the query. Then, communication can be managed between the second party and at least one third party of the selected subset.

In another aspect, an apparatus that is provided for selecting a recipient for a query from a party within a social network comprises a computer-readable medium comprising sets of codes for causing a computer to receive a response constraint from a first party of a social network, to receive a query containing a query constraint from a second party of the social network, to select a subset of parties of the social network that satisfy the query constraint, to exclude the first party in the subset based upon the response constraint not being satisfied by the query, and to manage communication between the second party and at least one third party of the selected subset.

In yet further aspect, a method is provided for selecting a recipient for a query from a party within a social network. A query is received from a querying party of a social network. A query constraint is determined necessary to answer the query. A plurality of candidate recipients is selected as a subset of parties of the social network that satisfy the query constraint. A level of difficulty is determined for the query constraint. A candidate recipient capable of responding to more difficult level of query constraint is excluded in response to determining that another candidate recipient can respond in order to optimize query distribution. Communication is managed between the querying party and at least one recipient party of the selected subset.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

A social network service provides trusted, timely and managed communications between a querying individual and an informed individual by optimizing distribution of queries to reflect a requisite amount of expertise necessary (i.e., interest, background, education, demographic attribute, etc.). Those candidate recipients with a rare level of expertise or specialization can specify a desired level of participation, which is respected. In order not to exhaust their availability, those who are less qualified or part of a larger demographic category appropriate for the query are selected to handle queries of lesser difficulty or less specialization. Anonymity if desired by the recipient party can be supported by increasing the pool of candidate recipients so that the querying party cannot reasonably ascertain who is responding. Timeliness of response, as well as satisfaction in the response, is tracked in order to affect redirection of a query.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "store," "device," "network," "cloud," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Specifically, the subject innovation can be utilized with a variety of hardware configurations such as, but not limited to disability assisted input/output facilities, voice enabled input/output, tactile (e.g., Braille, etc.) keyboard, etc. Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Figure 1:
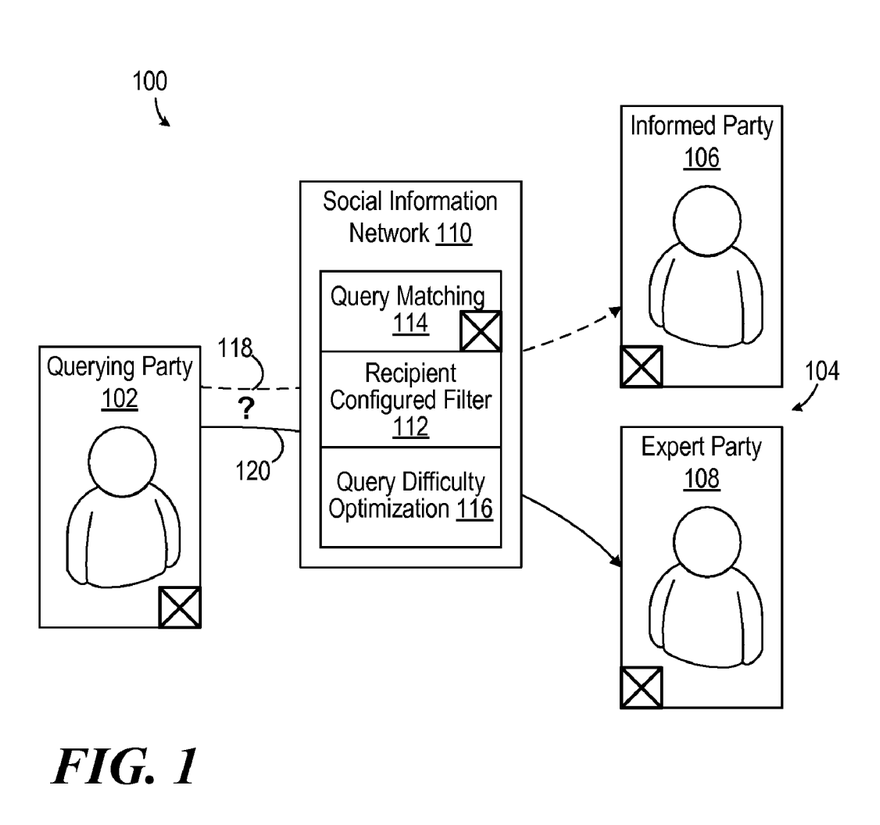
FIG. 1 illustrates a block diagram of a social network for managing communication between a querying party and a recipient party selected to optimize query distribution.

Now turning to the figures, FIG. 1 illustrates a social network system 100 for optimizing query distribution between a querying party 102 and a plurality of candidate recipients 104 of a social network, depicted as an informed party 106 and an expert party 108. A social information network platform 110 enables candidate recipients 104 to configure a filter 112 in order to specify a desired level of participation (e.g., frequency of queries, degree of association with querying party 102, desired anonymity, attributes of queries, etc.). A query matching component 114 of the social information network platform 110 determines a plurality of candidate recipients 104 whose expertise (i.e., interest, background, education, demographic attribute, etc.) is a match for a query. In particular, a query difficulty optimization component 116 assesses that a query 118 requires a lower degree of expertise to answer and that a query 120 requires a higher degree of expertise to answer. In order to optimize distribution, the easier query 118 can be directed to an informed party 106 and the harder query 120 can be directed to an expert party 108. Thus, the expert party's available participation is not exhausted while others are under-utilized.

For example, the querying party 102 can have a question that sufferers of a disease can answer and is seeking for support. The larger pool of sufferers of the disease can be the informed party 106. By contrast, the querying party 102 can have a question regarding treatment options for a disease that requires the expert party 108 to answer. As another example, the querying party 102 can have a question about finding a restaurant while on business or leisure travel, for which a large number of informed parties 106 could suffice. Query matching could first look to geographic proximity followed by demographic similarities to find candidate recipients. One of these candidate recipients 104 could be an expert party 108 needed for other types of expertise (e.g., knowledge in a technical discipline), which is thus excluded to preserve their availability.

Figure 2:
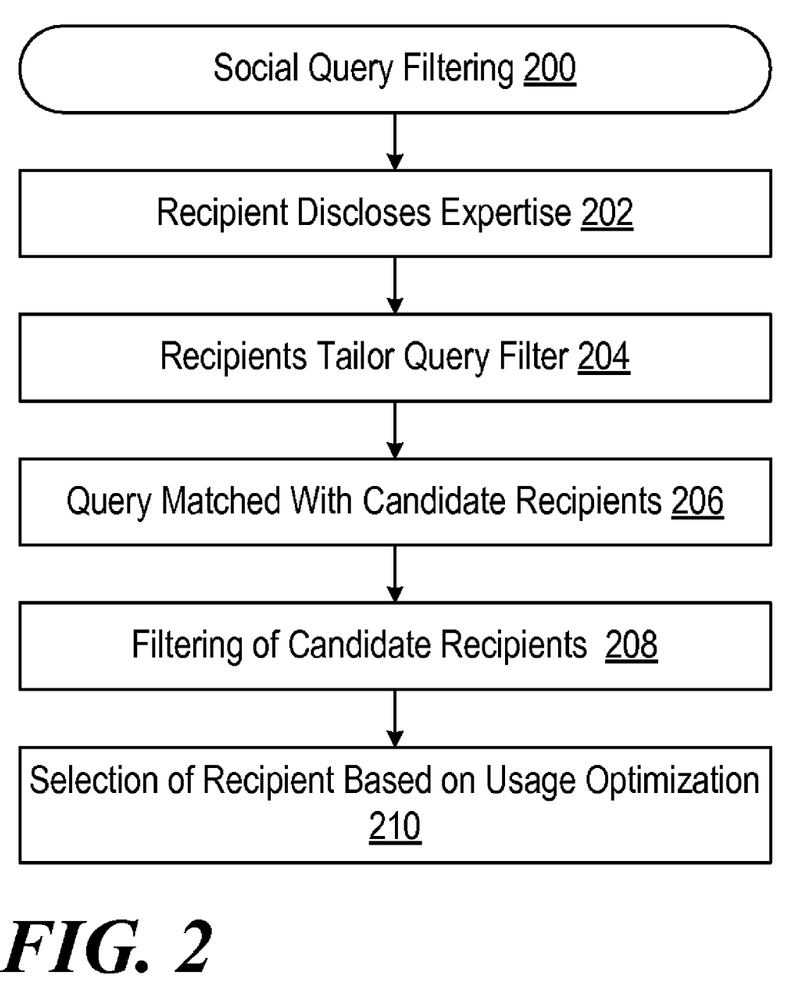
FIG. 2 illustrates a flow diagram of a methodology for social query filtering.

FIG. 2 illustrates methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

A social query filtering methodology 200 begins by a recipient disclosing his expertise in block 202. Recipients can tailor a query filter in block 204, such as limiting topics of interest, a number of degrees of separation or other association metric (e.g., membership in the same demographic, civic, religious, academic group, etc.), or a frequency of query response, etc. In block 206, a received query is matched with candidate recipients based upon attributes or constraints of the query. In block 208, filtering of candidate recipients is made to respect their volunteered level of participation. In block 210, selection of one or more recipients is made based upon usage optimization.

Figure 3:
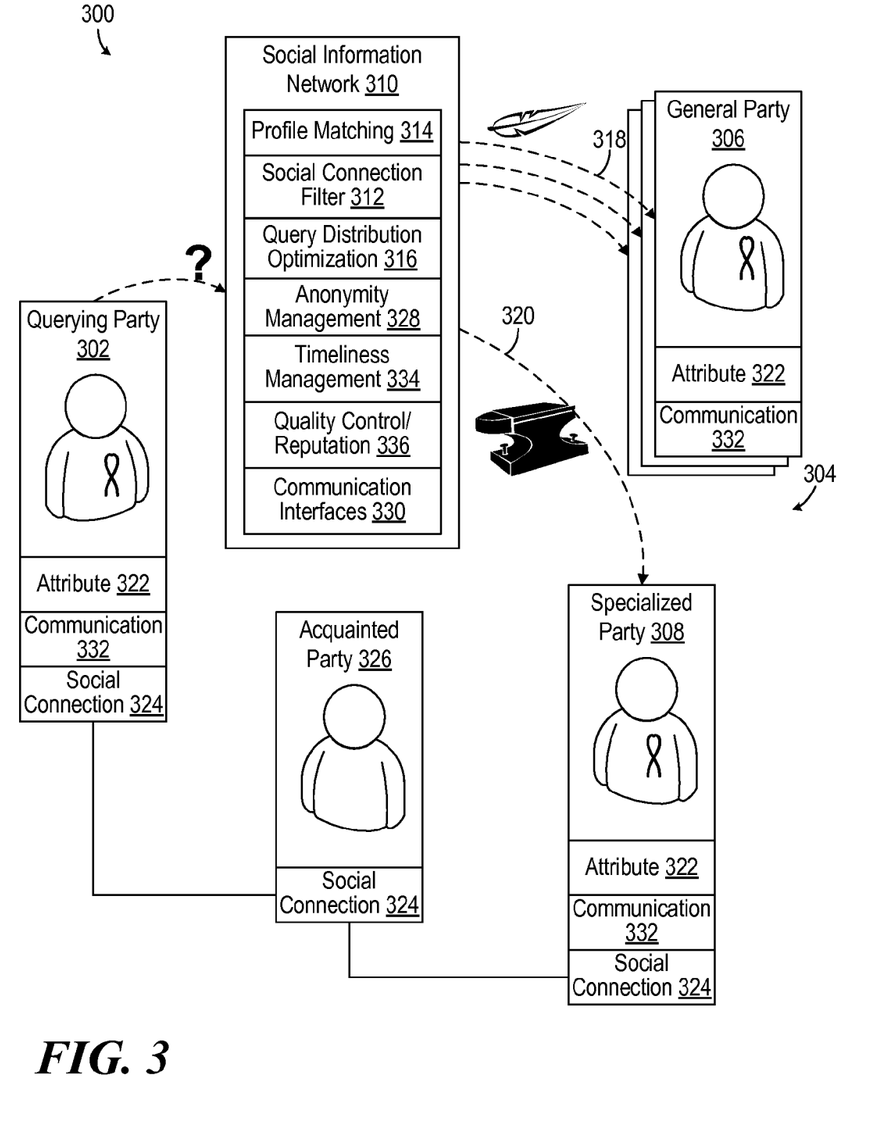
FIG. 3 illustrates a block diagram of a social network for managing anonymous, timely and trusted communication between a querying party and a recipient party selected to optimize query distribution.

In FIG. 3, a social network system 300 that manages anonymous, timely and trusted communication between a querying party 302 and a plurality of recipient parties 304 selected to optimize query distribution. The candidate recipients 304 overall or with regard to certain query topics can be deemed a general party 306 (e.g., widely held knowledge or member of large relevant demographic category) or a specialized party 308 (e.g., expert knowledge or member of a small relevant demographic category). For example, a social information network platform 310 enables candidate recipients 304 to configure a social connection filter 312 in order to specify a desired level of participation (e.g., frequency of queries, degree of association with querying party 302, desired anonymity, attributes of queries, etc.). A profile matching component 314 of the social information network platform 310 determines a plurality of candidate recipients 304 whose expertise (i.e., interest, background, education, demographic attribute, etc.) is a match for a query. In particular, a query distribution optimization component 316 assesses that a query 318 draws upon a large subset of candidate recipients 304, such as general parties 306, to answer and that a query 320 draws upon a small subset of candidate recipients 304, such as specialized party 308. In order to optimize distribution, the less constrained query 318 can be directed to the general party 306 and the more constrained query 320 can be directed to the specialized party 308.

Each party 302, 306, 308 can have at least one assigned, associated or specified attribute 322 that can be used to socially associate parties 302, 306, 308 or to ascertain an appropriate level of knowledge. Examples of such attributes 322 can be organizational membership, location, education, profession, interests, personal experience, physical characteristics, etc. A social connection 324 between the querying party 302 and one of the candidate recipients 304, such as the specialized party 308 can also define a degree of social separation. In particular, the querying party 302 can be linked to an acquainted party 326, who in turn is linked to the specialized party 308. It should be appreciated that the degree of separation could be less than or more than two steps removed. The degree of connectedness (e.g., association) can provide a constraint imposed by the querying party 302 for trustworthiness in any response. Alternatively or in addition, the degree of connectedness can be imposed as a constraint by a recipient candidate 304 to limit participation.

In order to encourage participation, some parties 302, 306, 308 can prefer anonymous communications provided by an anonymous management component 328 of the social information network platform 310. The platform 310 can provide a communication interface 330 to contact parties 302, 306, 308 and to route responses to preferred or available means in a manner transparent to the parties 302, 306, 308. Anonymity can also require that a pool of candidate recipients can be enlarged in order to preserve a sense or a reality of anonymity. If query constraints are very narrow, only one or a very small number of candidate recipients can be identified. It can be advantageous to widen the constraint, and to communicate that the query bounds have been widened to the querying party 302, so that attempts are discouraged to ascertain the identity of the selected candidate recipient 304.

The communication interface 330 can also determine availability of a candidate recipient 304. Each party 302, 306, 308 can each have one or more communication means 332. The type of communication medium can affect the selection of an appropriate candidate recipient 304, such as being able to communicate in the first place. The tracking of participation with the social network system 300 can also be determined by the communication means 332.

Further leveraging availability information from the communication means 332 tracked for each party 302, 306, 308, timeliness management 334 by the platform 310 can affect selection based on time criticality of the query. For example, the querying party 302 can be travelling through a locale wanting an immediate recommendation for lodging or a restaurant. A candidate recipient 304 who uses only instant messaging but who is offline can be excluded. As another example, a selected candidate recipient 304 or group of candidate recipients 304 can be deemed overdue to respond to the assigned query, prompting the timeliness management 334 to reassign the query and perhaps to change a weighting on a reliability or availability metric for the previously assigned candidate recipients 304.

To further enhance future query distribution, a quality control/reputation component 336 of the platform 310 can automatically screen queries or responses for inappropriate language, etc., to change access/assignment or exclude certain parties 302, 306, 308 from using the social network system 300. Alternatively or in addition, complaints from parties 302, 306, 308 can be reviewed or automatically tallied to affect access/assignment of queries. For example, an informed party 306 could be reassigned as an expert party 308 in a certain aspect based upon recommendations. Conversely, an expert party 308 could be lowered to an informed party 306 based on a degree of expertise exhibited in responses. For a completely unsatisfactory performance, such an individual could be deemed only capable of performing as a querying party 302 and not a candidate recipient 304. Quality control/reputation component 336 can also enforce a level of participation necessary in order to be entitled to making queries.

It should be appreciated that more than one recipient candidate 304 can receive an assigned query. Depending upon the communication means or other considerations, the first respondent could obviate the need for others to respond. Alternatively, other recipients could see the first or subsequent respondents reply in order to critique, enhance, or contradict the reply.

Figure 4:
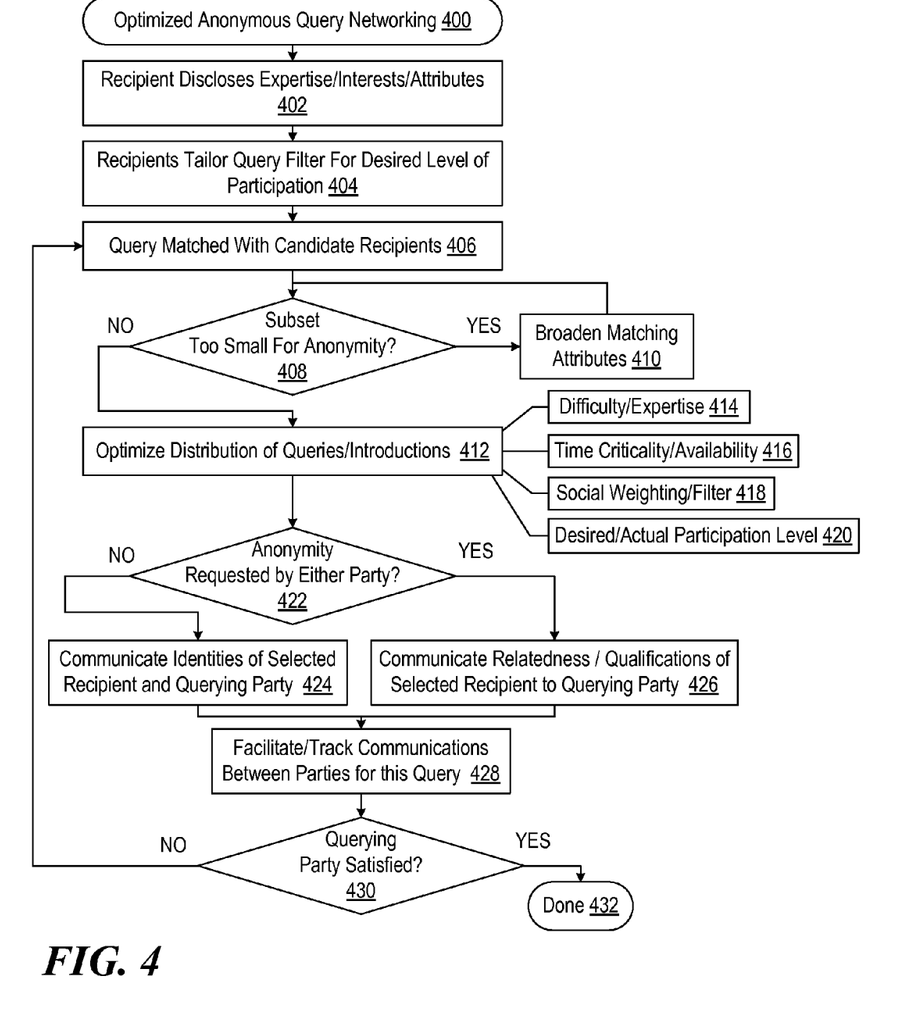
FIG. 4 illustrates a flow diagram of a methodology for optimized anonymous query networking.

In FIG. 4, a methodology 400 for optimized anonymous query networking begins in block 402 with a recipient disclosing attributes, such as expertise and interests. The recipient can tailor a query filter in block 404 to a desired level of participation. It should be appreciated with the benefit of the present disclosure that these preferences could be provided as a default to not inundate a typical person. Furthermore, a specified or default query filter could be automatically adjusted based upon participation levels by a particular recipient. For example, if the recipient quickly and expertly responds to questions in a certain topic then the participation level can be increased or the reputation for expertise increased to focus assignment of queries of greater difficulty.

In block 406, a received query is matched with candidate recipients. A determination is made in block 408 as to whether the selected subset is too small to preserve anonymity if required. If so, the matching attributes are broadened in block 410, such as widening the geographic window. Then distribution of queries/introductions is optimized in block 412. Such optimization can account for difficulty of the query and the expertise of the candidate recipients in block 414, the time criticality of the query and the availability of the candidate recipients in block 416, or the social weight (i.e., association) of the parties to enhance the commonalities in block 418. Social weighting conversely can encourage selecting someone outside of a particular paradigm of the querying party. Social filtering could also be imposed by the recipient candidates. In block 420, the desired/actual participation level of the candidate recipients can be considered to optimize distribution. For example, a comparison of the utilization of the candidate recipients could be compared against a norm to weight a higher or lower probability of a random assignment. For another example, a duration of time since being assigned a query could be tracked and used.

In block 422, a determination is made as to whether anonymity was requested by either party. If not, the identities of selected recipients and/or querying party as appropriate are communicated to the other party. If anonymity is appropriate in block 422, then the relatedness/qualifications of the selected recipient or querying party can be communicated in block 426 to the other party to indicate trustworthiness or desired commonality. Communications between the parties are facilitated and tracked in block 428 as required for anonymity, quality control, and future query distribution. If the querying party is determined to not be satisfied in block 430 (e.g., untimely response, poor quality response, etc.), then the process can return to block 406 and otherwise is done 432.

Figure 5:
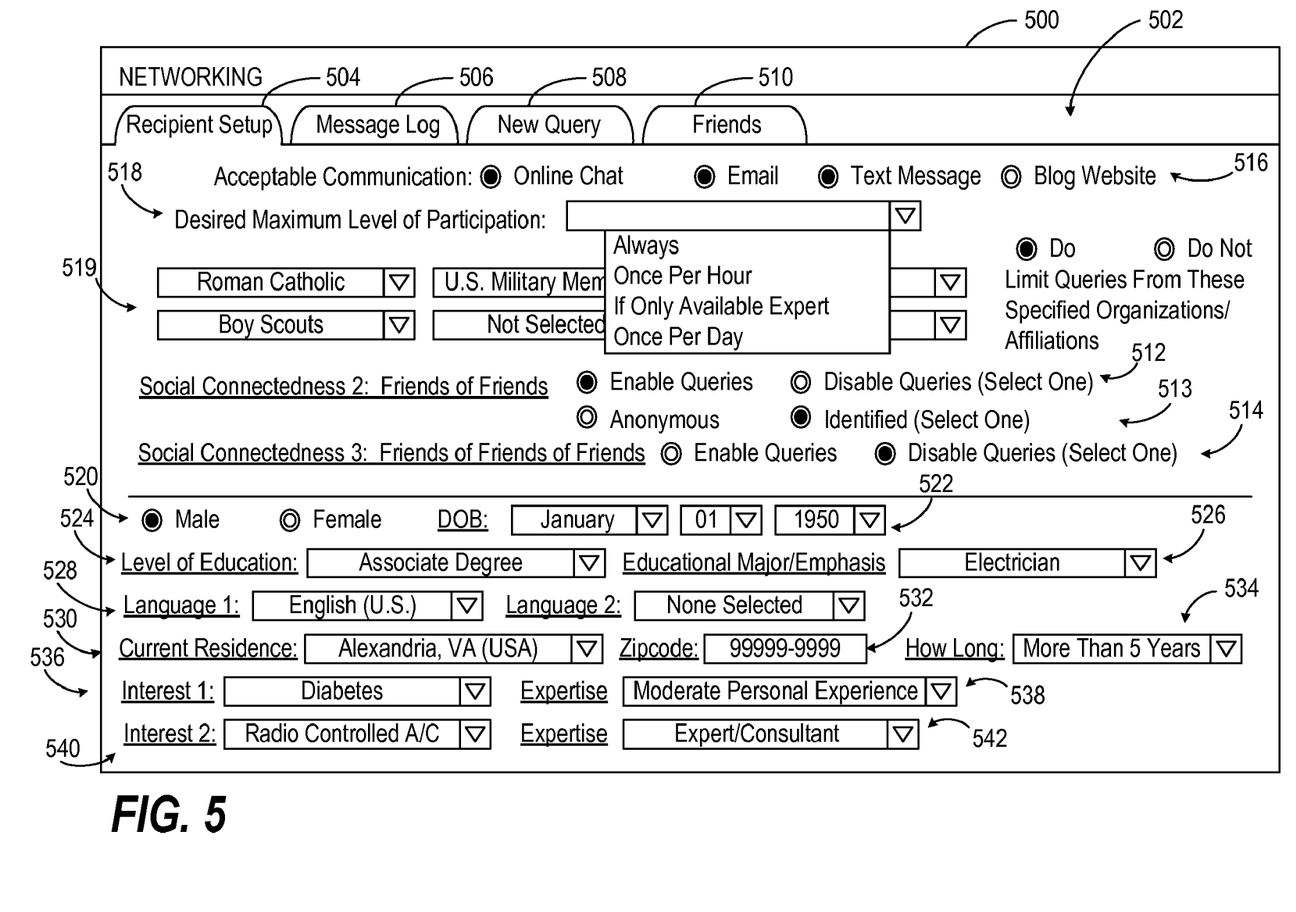
FIG. 5 illustrates a diagram of a graphical user interface for setup of recipient preferences.

In FIG. 5, an illustrative graphical user interface (GUI) 500 for interacting with a networking system 502 provides a recipient setup tab 504, message log tab 506, a new query tab 508, and a friends tab 510. A degree of separation (i.e., connectedness) can be specified as depicted at 512 as enabling or disabling this limit for a particular number of degrees (e.g., 2). Whether or not this level of connectedness warrants anonymity is depicted at 513. This social connectedness can be differentiated for each level of connectedness (e.g., 3), which is disabled in the illustrative depiction at 514.

The recipient can specify what types of communication can be utilized to receive a query or response, depicted at 516 as including multiple selections for online chat, email, short message service text messaging, and a sponsored blog website. A frequency of being assigned queries (i.e., desired level of participation) can be specified, depicted at 518 as a pull-down menu for always, once per hour, if only available expert, or once per day. Associations/affiliations can be specified as depicted at 519 (e.g., Roman Catholic, Boy Scouts, U.S. Military member) that are used to limit queries or to determine an association/degree of a common paradigm between parties.

The recipient setup tab 504 also allows a recipient candidate to specify attributes, such as sex depicted at 520, date of birth (DOB) depicted at 522, a level of education (e.g., associate degree) depicted at 524, an education major/emphasis (e.g., electrician) depicted at 526, languages proficiency depicted at 528, a current residential city and state depicted at 530, a current zip code depicted at 532, a duration of residency depicted at 534, a first interest (e.g., diabetes) depicted at 536 with a corresponding level of expertise (e.g., moderate personal experience) depicted at 538, and a second interest (e.g., radio controlled toy aircraft) depicted at 540 with a corresponding level of expertise (e.g., expert/consultant) depicted at 542.

Figure 6:
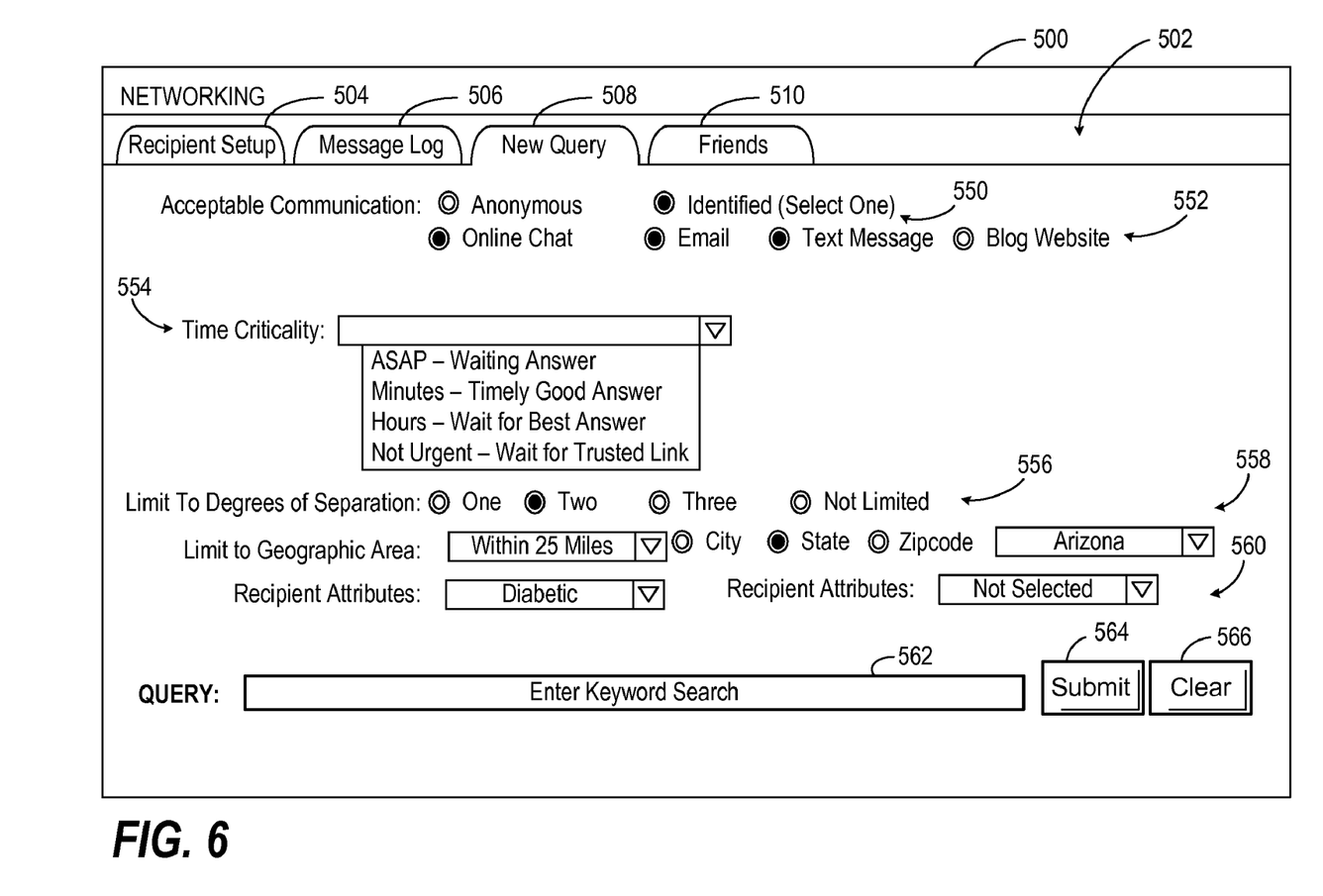
FIG. 6 illustrates a diagram of a graphical user interface for a constrained query submission.

In FIG. 6, the new query tab 508 allows a querying party to request an anonymous communication or not, as depicted at 550. A desired means of communication can be specified, depicted at 552 as online chat, email, text message, and blog website. This specification could default to the currently utilized means. At block 554, a time criticality of the query can be specified (e.g., ASAP—awaiting answer, minutes—timely good answer, hours—wait for best answer, not urgent—wait for trusted link). As depicted at 556, the query can be limited to degrees of separation (e.g., one, two, three, not limited). As depicted at 558, the query can be limited to an assignment by geographic area (e.g., distance from a city, state, zip code). As depicted at 560, the query assignment can be limited to one or more recipient attributes. A keyword query entry box 562 can be submitted by selecting a submit button 564 or cleared with a clear button 566.

Figure 7:
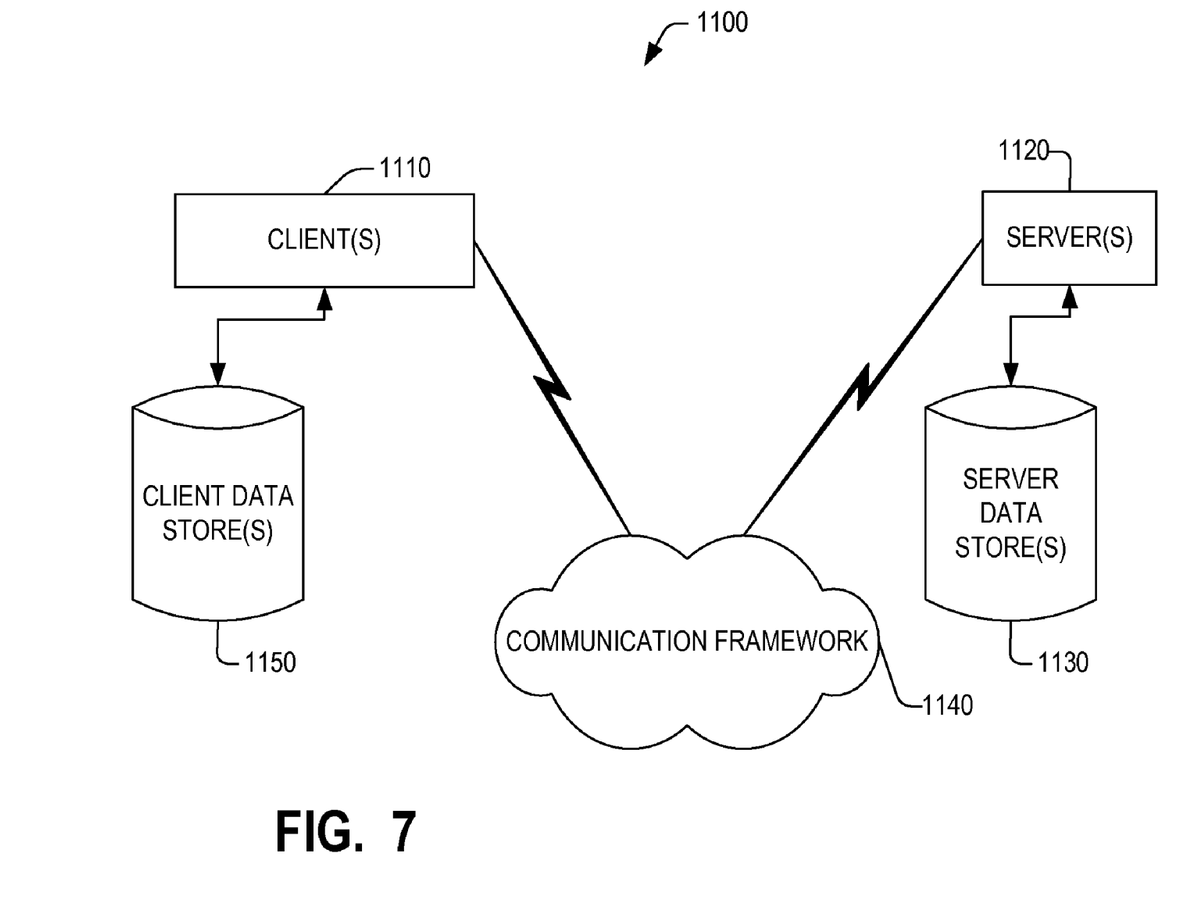
FIG. 7 illustrates an exemplary networking environment, wherein the novel aspects of the claimed subject matter can be employed.
Figure 8:
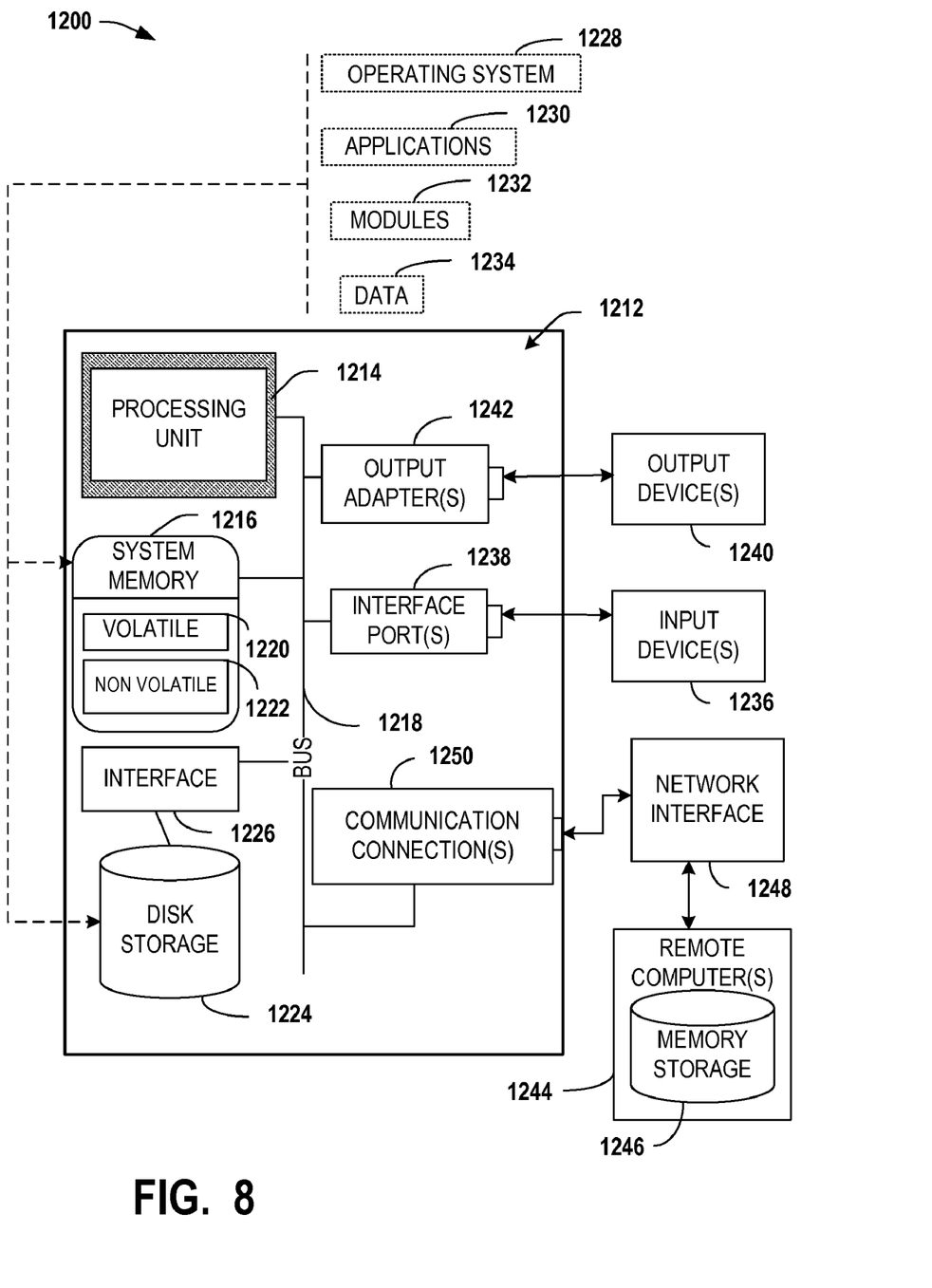
FIG. 8 illustrates an exemplary operating environment that can be employed in accordance with the claimed subject matter.

In order to provide additional context for implementing various aspects of the claimed subject matter, FIGS. 7-8 and the following discussion is intended to provide a brief, general description of a suitable computing environment in which the various aspects of the subject innovation may be implemented. For example, a counselor component that facilitates automatically generating questions to ask a doctor during an appointment, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 7 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1150 that can be employed to store information local to the client(s) 1110. Similarly, the server(s) 1120 are operably connected to one or more server data store(s) 1130 that can be employed to store information local to the servers 1120.

With reference to FIG. 8, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 8 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 8 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212 and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A method comprising:
under control of one or more processors configured with executable instructions, receiving, from a plurality of first parties of a social network, at least one response constraint specifying a degree of connectedness imposed by the first parties for responding to queries;
receiving a query containing a query constraint from a second party of the social network;
selecting a subset of the first parties of the social network that satisfy the query constraint;
excluding from the subset at least one of the first parties in the subset based upon one of the at least one response constraint not being satisfied;
determining a degree of difficulty of the query as one of a first degree or a second degree, such that queries of the first degree are answerable by a specialized party using expert knowledge and queries of the second degree are answerable by a general party using widely held knowledge;
determining a level of expertise of a plurality of the first parties of the social network relevant to the query as one of a first level able to respond to queries of both the first degree and the second degree, or a second level able to respond to queries of the second degree; and
optimizing distribution of queries by selecting one or more first parties of the first level of expertise to receive the query in response to a determination that the query is of the first degree of difficulty, and otherwise selecting one or more first parties of the second level of expertise in response to a determination that the query is of the second degree of difficulty.

2. The method of claim 1, further comprising determining a degree of connectedness between the first parties in the subset and the second party to determine satisfaction of at least one response constraint.

3. The method of claim 2, further comprising determining a number of degrees of separation between the first parties in the subset and the second party.

4. The method of claim 2, further comprising determining a shared personal demographic category to determine satisfaction of the at least one response constraint.

5. The method of claim 1, further comprising determining a degree of association between the first parties and the second party to determine satisfaction of the query constraint.

6. The method of claim 5, further comprising determining a number of degrees of separation between the first parties and the second party.

7. The method of claim 5, further comprising determining a shared personal demographic category to determine satisfaction of the query constraint.

8. The method of claim 1, further comprising receiving a query containing a query constraint of time criticality and selecting the at least one first party of the subset based upon availability satisfying the time criticality.

9. The method of claim 8, further comprising determining a lack of a timely response from the at least one first party of the subset and redirecting the query to another first party of the subset.

10. The method of claim 1, further comprising managing anonymous communication between the second party and the at least one first party of the subset to maintain anonymity of the at least one first party of the subset.

11. The method of claim 10, further comprising:
determining that the subset is too small to maintain anonymity of the at least one first party of the subset;
expanding the query criteria to increase a number of the first parties in the subset; and
communicating the expanded query criteria to the second party.

12. The method of claim 1, further comprising:
managing communication of the query between the second party and at least one first party remaining in the subset.

13. The method of claim 1, further comprising redirecting the query in response to determining that the second party deems a response from the at least one first party of the subset to be unsatisfactory.

14. A system comprising:
one or more processors in operable communication with a computer-readable medium, the computer-readable medium including codes executable on the processor to implement components comprising:
a social connection filter to receive profiles generated by a plurality of recipient parties of a social network, the profile for each recipient party including a response constraint;
a profile matching component to:
receive a query containing a query constraint from a querying party of the social network;
select a first subset of the recipient parties of the social network, the first subset including one or more candidate recipient parties that satisfy the query constraint;
determine a degree of difficulty of the query as one of a first degree or a second degree, such that queries of the first degree are answerable by a specialized party using expert knowledge and queries of the second degree are answerable by a general party using widely held knowledge;
determining a level of expertise of a plurality of the first parties of the social network relevant to the query as one of a first level able to respond to queries of both the first degree and the second degree, or a second level able to respond to queries of the second degree; and
optimize distribution of queries by selecting one or more first parties of the first level of expertise to receive the query in response to a determination that the query is of the first degree of difficulty, and otherwise selecting one or more first parties of the second level of expertise in response to a determination that the query is of the second degree of difficulty;
an anonymity management component to expand a number of the candidate recipient parties to obtain a second subset of candidate recipient parties larger than the first subset to protect anonymity of the one or more candidate recipient parties that satisfy the query constraint; and
an interface to communicate the query to the second subset of candidate recipients.

15. A method comprising:
under control of one or more processors configured with executable instructions,
receiving a query from a querying party of a social network;
determining a query constraint necessary to answer the query;
selecting a plurality of candidate recipients as a first subset of parties of the social network that satisfy the query constraint;
determining a level of difficulty of the query constraint as belonging to one of a first level of difficulty or a second level of difficulty, such that queries of the first level of difficulty are answerable by a specialized party using expert knowledge and queries of the second level of difficulty are answerable by a general party using widely held knowledge;
distinguishing the first subset into a second subset of one or more candidate recipients determined to be capable of responding to both the first level of difficulty and the second level of difficulty, and a third subset of one or more candidate recipients determined to be capable of responding to the second level of difficulty but not the first level of difficulty;
excluding the second subset from receiving the query in response to determining that the level of difficulty of the query constraint belongs to the second level of difficulty; and
managing communication of the query between the querying party and the one or more candidate recipients of the third subset.

16. The method of claim 15, further comprising managing the communication between the querying party and the at least one recipient party of the third subset for maintaining anonymity of the at least one recipient party of the third subset.

17. The method of claim 16, further comprising expanding the query constraint in order to enlarge the size of the third subset for maintaining and increasing anonymity.

18. The method of claim 15, further comprising managing communication between the querying party and the at least one recipient party of the third subset by selecting the at least one recipient party of the third subset based upon time criticality of the query and responsiveness of the candidate recipient parties of the third subset.

19. The method of claim 15, further comprising selecting the plurality of candidate recipients based at least in part upon degrees of separation.

20. The method of claim 15, further comprising selecting the plurality of candidate recipients based at least in part upon a determination of a shared personal demographic category.

* * * * *